US007970654B2

(12) United States Patent
Clibanoff

(10) Patent No.: US 7,970,654 B2
(45) Date of Patent: Jun. 28, 2011

(54) SYSTEM AND METHOD FOR PROCESSING SINGLE SALE TRANSACTIONS INVOLVING ONE OR MORE PAYORS

(76) Inventor: Andrew A. Clibanoff, Merion Station, PA (US)

( * ) Notice: Subject to any disclaimer, the term of this patent is extended or adjusted under 35 U.S.C. 154(b) by 0 days.

(21) Appl. No.: 12/476,058

(22) Filed: Jun. 1, 2009

(65) Prior Publication Data
US 2009/0299869 A1 Dec. 3, 2009

Related U.S. Application Data

(60) Provisional application No. 61/057,272, filed on May 30, 2008.

(51) Int. Cl.
G06Q 30/00 (2006.01)
(52) U.S. Cl. ......................................................... 705/26
(58) Field of Classification Search .................... 705/26, 705/27
See application file for complete search history.

(56) References Cited

U.S. PATENT DOCUMENTS

| 5,887,273 | A | * | 3/1999 | Ziarno | 705/39 |
| 7,343,335 | B1 | * | 3/2008 | Olliphant | 705/36 R |
| 2002/0147621 | A1 | * | 10/2002 | Smith, III | 705/7 |
| 2004/0267650 | A1 | * | 12/2004 | Burnett | 705/35 |
| 2006/0122856 | A1 | * | 6/2006 | Rushton et al. | 705/1 |
| 2007/0282663 | A1 | * | 12/2007 | Barlament | 705/10 |
| 2008/0228614 | A1 | * | 9/2008 | Ben-Zvi et al. | 705/35 |
| 2009/0125410 | A1 | * | 5/2009 | Perlman | 705/26 |
| 2009/0327128 | A1 | * | 12/2009 | Olliphant | 705/40 |
| 2010/0121745 | A1 | * | 5/2010 | Teckchandani et al. | 705/30 |
| 2010/0191629 | A1 | * | 7/2010 | Olliphant | 705/30 |
| 2011/0029416 | A1 | * | 2/2011 | Greenspan | 705/30 |

OTHER PUBLICATIONS

Ro et al. "Evolving Models of Supplier Involvement in Design: The Deterioration of the Japanese Model in the U.S. Auto", IEEE Transactions on Engineering Management, vol. 55, No. 2, May 2008.*

* cited by examiner

Primary Examiner — Naeem Haq
(74) Attorney, Agent, or Firm — Pepper Hamilton LLP

(57) ABSTRACT

A system for processing sales transactions may include a first computing device in communication with a buyer-operated computing device, and a computer-readable storage medium in communication with the first computing device. The computer-readable storage medium may include programming instructions for receiving an order including one or more of a commitment of a buyer to purchase an item, and a preferred share value associated with the buyer, receiving contact information associated with one or more third parties, receiving a fractional share value associated with each of the one or more third parties, and in response to a sum of the fractional share values associated with each third party and the preferred share value equaling the purchase price associated with the item, using the received contact information to send a message to each third party. Each message may include the fractional share associated with the third party.

13 Claims, 9 Drawing Sheets

| RECORD | MERCHANT | ITEM | PURCHASE PRICE | BUYER'S USER ID | BUYER'S PREFERRED SHARE | PAYMENT INFO | END OF PERIOD | FRACTIONAL SHARE | THIRD PARTY CONTACT INFO | THIRD PARTY COMMITMENTS | THIRD PARTY PAYMENT INFO | PERIOD ENDED? | THIRD PARTY CONTRIBUTION | BUYER'S BALANCE DUE |
|---|---|---|---|---|---|---|---|---|---|---|---|---|---|---|
| 1 | amazon.com | 123456789 | $750 | BUYER 1 ID | $250 | 1111 2222 3333 | 4/1/2008 | | | | | Y | | $250 |
| | | | | | | | | $200 | TP1@email1.com | $200 | 1234 5678 9012 12345 | | $200 | |
| | | | | | | | | $100 | TP2@email2.com | $100 | 9876 5432 1098 7654 | | $100 | |
| | | | | | | | | $100 | TP3@email3.com | $100 | 9999 8888 7777 6666 | | $100 | |
| | | | | | | | | $50 | TP4@email4.com | $50 | 8888 7777 6666 5555 | | $50 | |
| | | | | | | | | $50 | TP5@email5.com | $50 | 7777 6666 5555 4444 | | $50 | |
| 2 | bn.com | 987654321 | $600 | BUYER 2 ID | $100 | 2222 3333 4444 | 4/3/2008 | | | | | Y | | $150 |
| | | | | | | | | $100 | TP6@email6.com | $100 | 3333 4444 5555 6666 | | $100 | |
| | | | | | | | | $100 | TP7@email7.com | $100 | 4444 5555 6666 7777 | | $100 | |
| | | | | | | | | $100 | TP8@email8.com | $200 | 5555 6666 7777 8888 | | $200 | |
| | | | | | | | | $100 | TP9@email9.com | $50 | 6666 7777 8888 9999 | | $50 | |
| | | | | | | | | $100 | TP10@email10.com | $100 | 7777 8888 9999 0000 | | $0 | |
| 3 | ebay.com | 555555555 | $500 | BUYER 3 ID | $100 | 3333 4444 5555 | 4/5/2008 | | | | | N | | TBD |
| | | | | | | | | $100 | TP11@email11.com | $100 | 8888 9999 0000 1111 | | | |
| | | | | | | | | $100 | TP12@email12.com | $100 | 9999 0000 1111 2222 | | | |
| | | | | | | | | $100 | TP13@email13.com | $100 | | | | |
| | | | | | | | | $100 | TP14@email14.com | $100 | | | | |

FIG. 3

Pay Parade

*Share.Buy.Give.*

REGISTRATION / NEW TENDER

Personal Information
- Email Address: derek@payparade.com
- Confirm Email Address:
- First Name:
- Last Name:
- Password:
- Confirm Password:

Billing Information
- Billing Address:
- Billing City:
- Billing State:
- Billing Zip:
- Telephone: ___-___-___

Credit Card Information
- Card Type:
- Credit Card Number:
- Name As Appears on Card:
- Expiration Date: __ / __ (mm / yyyy)

[ Continue ] [ Reset ]

Customer Support
Phone: 1-877-SUPPORT
E-mail: support@payparade.net

Term of Use / Privacy Policy

FIG. 5

Pay Parade
Share.Buy.Give.

You are logged in with the credentials of user@hotmail.com
LOG OFF

ABC Store

Your Order

Order ID: 54
Order Date: Sun. Apr 13
00:25:11 PDT 2008

Client: ABC Store ( ID:100001 )
Order ID: 8301752

Men's Movado Luno Watch with Black Dial (Model: 0605635) — $950.00
Full Product Description Ladies' Movado Juro Two-Tone Bracelet Watch (Model: 0605031) — $895.00
Full Product Description SubTotal $1845.00
Tax $0.00
Shipping $0.00
Pay Parade Service Cost $4.00
Grand Total $1849.00

This order appears to be balanced, you can continue and 'LOCK' the order.

Payment Information

1. Initiator (Derek.Graeber@hotmail.com)
   Buyer/Guarantor
   Preferred Share $ [1349]  (Update Amount)

Payment Method  (Edit Credit Card)
   Credit Card          Exp
   Ends in -- 1111 [VISA]  05 / 2010  (Change)

2. Third Party1 (user@payparade.com)
   Amount Requested to be Paid $ [500]
   Fractional Share  (Update Amount)

Payment Method
   To Be Added By Payor

Total Amount on Order: $1849.00
Amount Accounted For: $1849.00
Amount Not Accounted For: $0.00

Add Third Party Payors To Order

Add New Third Party Payor (Email Address): [         ]   Fractional Share [     ]
NickName (optional): [         ]
(Add)

Complete and Lock Order Information
Notify Other users via email. Feel free to add a custom message for the recipients of the email:

[                    ]

(Complete and Lock Order)

Helpful Hints:

When completing the order information remember to:
1. Add additional Payors by entering their email address in the location provided.
2. Modify the 'Amount Requested to be Paid' fields of all payors so the total will equal the total amount needed.
3. Once the order is balanced, a text field will be displayed to add a custom email text that goes to all the payors.
4. A 'Lock Order' button will be displayed to:
   - record all the order information
   - notify the other payors to add their tender information (notified via email)
   - begin the Pay Parade process of completing this order Customer Support
Phone: 1-877-SUPPORT
E-mail: support@payparade.net Term of Use / Privacy Policy

Pay Parade
Share.Buy.Give.

You are logged in with the credentials of user@hotmail.com
LOG OFF

ABC Store

Your Order

Order ID: 54
Order Date: Sun. Apr 13
00:25:11 PDT 2008

Client: ABC ( ID:100001 )
Order ID: 8301752

Men's Movado Luno Watch with Black Dial (Model: 0605635)
Full Product Description
$950.00

Ladies' Movado Juro Two-Tone Bracelet Watch (Model: 0605031)
Full Product Description
$895.00

SubTotal $1845.00
Tax $0.00
Shipping $0.00
Pay Parade Service Cost $4.00
Grand Total $1849.00

This order is now being processed, please contact your CS Rep for more info

Payment Information

1. Initiator (Derek Graeber@hotmail.com)

Amount Requested to be Paid $ 1349

Payment Method   (Edit Credit Card)
   Credit Card                    Exp
   Ends in -- 1111  [VISA]    05 / 2010   (Change)

2. Third Party1 (user@payparade.com)

Amount Requested to be Paid $ 500

Payment Method
   Credit Card                    Exp
   Ends in -- 1111  [VISA]    03 / 2011

STATUS: LOCKED

Total Amount on Order: $1849.00
Amount Accounted For: $1849.00
Amount Not Accounted For: $0.00

Customer Support
Phone: 1-877-SUPPORT
E-mail: support@payparade.net

Term of Use / Privacy Policy

FIG. 7

Pay Parade

*Share.Buy.Give.*

Thank you for adding your tender information! It has been successfully received. We show that your requested amount for payment is set at $500.00

This entire order is scheduled to be set to PROCESSED no later than April 13, 2006 12:55: 11 AM PDT

[Return to Pay Parade Order Info Page]

Customer Support
Phone: 1-877-SUPPORT
E-mail: support@payparade.net

Term of Use / Privacy Policy

To Return to Store, please Click Here.

We have received your request to use Pay Parade!!
From:      Pay Parade (payparade@payparade.com)
Sent:       Sun 4/13/08 3:25 PM
Reply-to:  payparade@payparade.com
To:          initiator@hotmail.com Please goto http://www.payparade.net/payparade/viewOrder.pp?pp=b3JkZXJpZD01NA== to see the information.

You will need to log in to add payors and distribute the cost responsibility.

Your USERNAME is this email address. Your TEMPORARY PASSWORD is 'theparade'.

This order will automatically begin to process in 30 minutes from when the order was placed.

FIG. 9

SYSTEM AND METHOD FOR PROCESSING SINGLE SALE TRANSACTIONS INVOLVING ONE OR MORE PAYORS

CROSS REFERENCE TO RELATED APPLICATIONS

This application claims the benefit of the filing date of Provisional Application No. 61/057,272 filed May 30, 2008.

FIELD OF THE INVENTION

The present invention relates generally to a system and method for processing single sales transactions that may have one or more payors. More particularly, the present invention relates to a computer-implemented system and method permitting a buyer to commit to the purchase of one or more items in a single sale transaction, thus ensuring eventual completion of the purchase transaction, while nevertheless providing for recruitment of additional payors to join in the purchase of the item(s) by contributing payments to be applied toward the purchase price, thus reducing the share of the purchase price to be borne by the original buyer.

Not Applicable

BACKGROUND

Various group purchasing methods are well known in the art. For example, a group may agree in advance to purchase a particular single item as a gift for a family member, coworker, etc. and to divide the eventual cost among the members of the group. In many instances, a lead member of the group will make the purchase, pay for the item in full, and then subsequently seek cash reimbursement of a portion of the cost from the other members of the group. Any failure of a group member to pay his or her portion of the cost is typically borne by the lead member of the group, since the purchase has already been completed, and paid for, by the lead member.

By way of further example, in advance of any purchase, cash contributions may be sought for application toward purchase of a specific item. However, if the total amount of contributions is less than the purchase price of the item, the purchase cannot be completed. The realization that the purchase cannot be completed may occur at such a time that it is then inconvenient or impossible to obtain a substitute item in a timely fashion, e.g. for presentation as a retirement gift to a co-worker at a retirement party.

Further, any approach in which one or more buyers agree with a merchant to purchase an item from the merchant only on a conditional basis, e.g. provided that sufficient funds can be raised, is unsatisfactory to the merchant because of the high degree of uncertainty with respect to eventual completion of the sale transaction, which can complicate the merchant's inventory management, sales projections, etc.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for processing sales transactions may include a first computing device in communication with a buyer-operated computing device, and a computer-readable storage medium in communication with the first computing device. The computer-readable storage medium may include one or more programming instructions for receiving an order including one or more of a commitment of a buyer to purchase an item, and a preferred share value associated with the buyer. The preferred share value may represent at least a first portion of a purchase price associated with the item. The computer-readable storage medium may also include one or more programming instructions for receiving contact information associated with one or more third parties, receiving a fractional share value associated with each of the one or more third parties, and in response to a sum of the fractional share values associated with each third party and the preferred share value equaling the purchase price associated with the item, using the received contact information to send a message to each third party. Each message may include the fractional share associated with the third party.

BRIEF DESCRIPTION OF THE FIGURES

FIG. 3 illustrates a simplified example of data fields maintained in an exemplary data structure according to an embodiment.

FIG. 5 illustrates an exemplary website interface according to an embodiment.

FIG. 6 illustrates an exemplary graphical user interface according to an embodiment.

FIG. 7 illustrates an exemplary order according to an embodiment.

FIG. 8 illustrates an exemplary confirmation according to an embodiment.

FIG. 9 illustrates an exemplary notification according to an embodiment.

DETAILED DESCRIPTION

A system and method for processing single sale transactions may involve one or more payors. More specifically, the system and method may involve obtaining a single buyer's commitment to purchase one or more items and/or services (collectively "items") from a merchant at a purchase price (including any applicable, taxes, shipping, handling, surcharges, etc.). Thus, the merchant is assured that the sale transaction will be completed, and any possible concern over timely availability of the items as a gift, for a party, etc. is avoided.

Further, the system and method may facilitate recruitment of additional payors that may join in the purchase of the item by committing to fund a share of the purchase price. The addition of any additional payors reduces the financial obligation of the buyer. Further, payment may be collected from all payors substantially contemporaneously, thus eliminating any collection problems of a type sometimes encountered when reimbursement is sought subsequent to a purchase sought, as discussed above.

A shared payment processing system may be provided in the form of an Internet— or otherwise network-accessible website or service. Thus, the shared payment processing system may be configured to interface with e-commerce websites as well as computerized order management and/or payment processing systems of traditional bricks-and-mortar type merchant establishments. By way of example, the shared payment processing system may maintain a website accessible via personal computers, PDAs, smartphones or other mobile computing devices using conventional web browsing software, and/or a network-accessible electronic interface permitting EDI or other similar electronic exchange of data with order management and/or payment processing systems of merchants.

Figure 1:
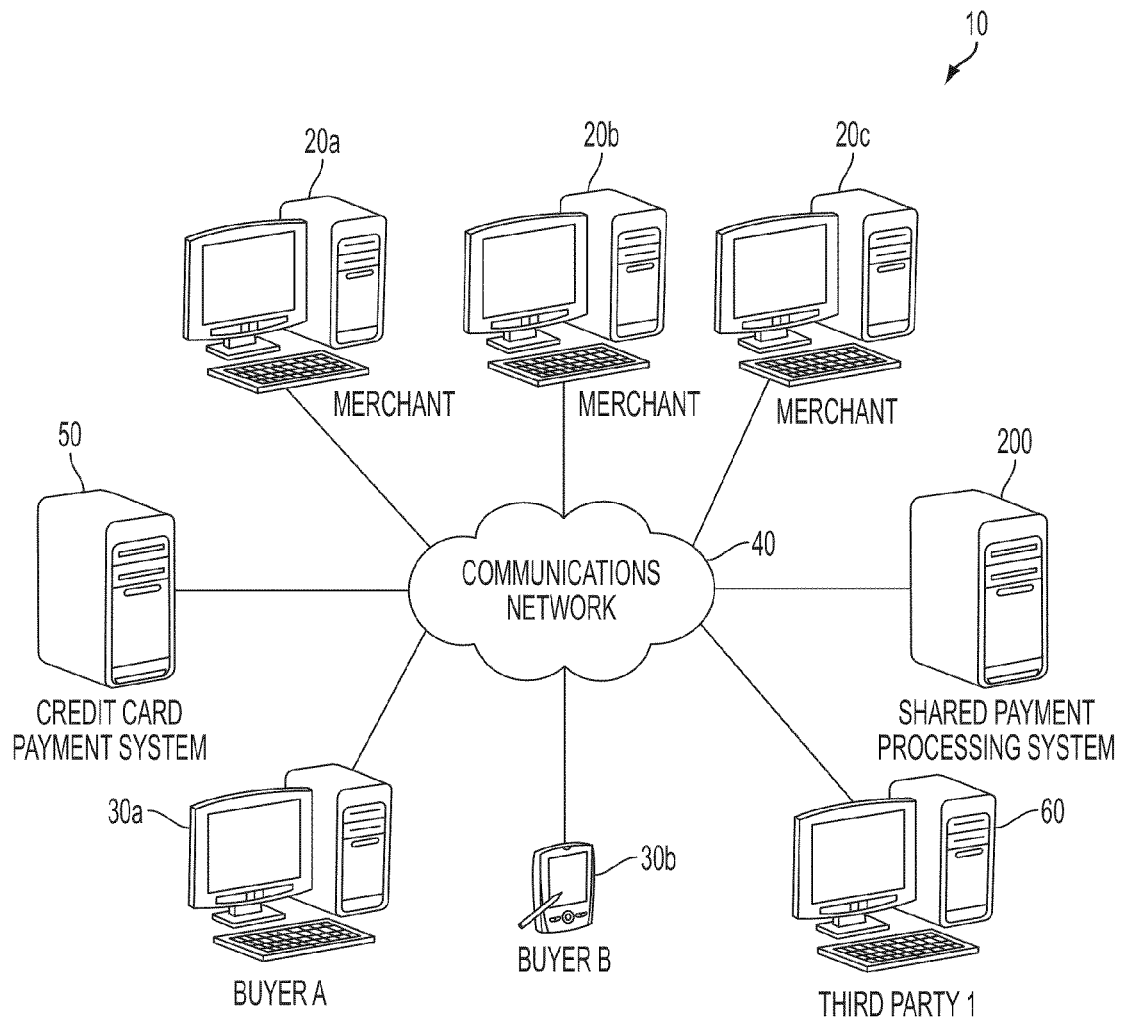
FIG. 1 illustrates a diagram of an exemplary environment for operation of a shared payment processing system according to an embodiment.

As shown by FIG. 1, an exemplary networked environment 10 may include a shared payment processing system 200 that may be configured to carry out methods described herein, as discussed in further detail with reference to FIGS. 2-4. The shared payment processing system 200 may be configured to present a website interface via which merchants, buyers and third parties may create respective user accounts, and/or otherwise provide relevant contact information, payment processing information, etc. to the system 200.

The network environment 10 may include a conventional credit card or other payment (collectively, credit card) payment system, which is shown logically for illustrative purposes only as a single-server credit card payment system 50. It will be appreciated that this system so represents existing payment processing networks.

The network environment 10 may include a plurality of merchant systems 20a, 20b, 20c and a plurality of buyer systems 30a, 30b that may communicate with the shared payment processing system 200 via a communications network 40, such as the Internet. Accordingly, each buyer system 30a, 30b may include conventional computerized hardware and software for receiving email and browsing the web, such as a suitably-configured personal computer, PDA, smart-phone, or the like. Each merchant system 20a, 20b, 20c may include computerized hardware and software for browsing the web, and for performing e-commerce related operations, such as providing a web-based e-commerce "store" and interfacing with the credit card payment processing system 50, as generally known in the art, or described herein.

Figure 2:
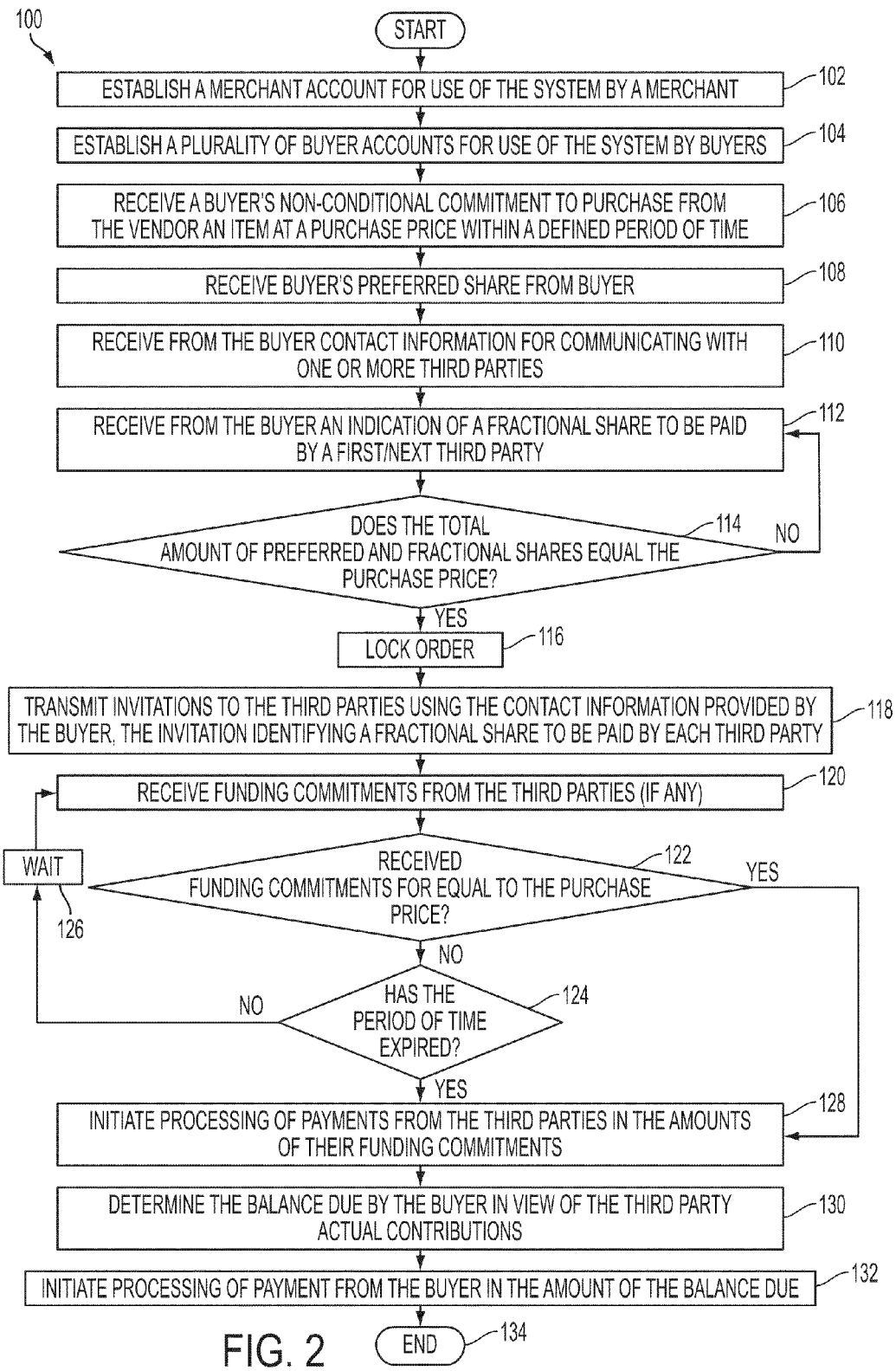
FIG. 2 illustrates a flow diagram of an exemplary illustrative method for processing single sale transactions involving one or more payors according to an embodiment.

FIG. 2 illustrates a flow diagram 100 of an exemplary method for processing single sale transactions involving one or more payors according to an embodiment. By way of context, it may be considered that a buyer may browse a website-based e-commerce "store" of a web-based retailer, such as Amazon, Inc. (amazon.com), Barnes & Noble, Inc. (bn.com), or eBay, Inc. (ebay.com) and may select one or more items for purchase, e.g. using a conventional shopping cart or other interface. Accordingly, much of the shopping experience in the context of the present invention may occur using the buyer's personal computer (PC), a PDA, smart-phone or other mobile computing device, 30a, 30b as shown in FIG. 1.

The buyer may provide credit card or other payment information for example via a website interface. In an embodiment, a checkbox or other option may be selected by the buyer to invoke the payment-sharing technology of the present invention. In another embodiment, the merchant's system may be configured such that simple providing of the credit card or other payment information may automatically invoke the payment-sharing technology of the present invention. In either case, by providing the credit card/payment information and authorizing a charge in the full amount of the purchase price, the buyer has made a non-conditional commitment to purchase the selected item(s).

In accordance with the present invention, the buyer may be presented, via the website, with a confirmation, such as a confirmatory-email, message, text message and/or the like, with an option to treat the transaction as a potential shared-payment transaction in accordance with the present invention. FIG. 9 illustrates an exemplary confirmation according to an embodiment. If the buyer chooses to do so, then the shared payment processing system 200 and its operation may be invoked to carry out the functionality described herein, as discussed in greater detail below with reference to FIG. 2.

FIG. 2 illustrates a flow diagram 100 of an exemplary illustrative method for processing single sale transactions involving one or more payors according to an embodiment. Referring now to FIG. 2, this exemplary method may begin with establishment of a merchant account for use of the shared payment processing system 200 by a merchant, as shown in step 102. For example, this may involve an individual's operation of a merchant system 20a to log on to the shared payment processing system 200 via a website interface presented by the shared payment processing system 200. Alternatively, this information may be gathered and provided to the system 200 without involvement of such a website interface. A merchant account may be created, and associated information stored by the shared payment processing system 200, in a conventional manner. Associated information may be stored as merchant account data 230 in a memory 218 of the system, e.g. in a database, as shown in FIG. 4. Establishment of the merchant account may involve providing one or more of the merchant's name, address, payment processing information (accounts, communication parameters), etc. This may prepare the shared payment processing system 200 to interact with the merchant system 20a on an as-needed basis.

As shown in FIG. 2, this exemplary method may involve establishment of one or more buyer accounts for use of the shared payment processing system by buyers, as shown at step 104. For example, this may involve an individual's operation of a buyer system 30a, such as a personal computer (PC), a PDA, smart-phone or other mobile device, to log on to the shared payment processing system via the website interface presented by the shared payment processing system 200. FIG. 5 illustrates an exemplary website interface according to an embodiment. A buyer account may be created, and associated information stored by the shared payment processing system 200, in a conventional manner. Associated information may be stored as buyer account data 232 in a memory 218 of the system, e.g. in a database, as shown in FIG. 4. Establishment of the buyer account may involve providing a record of the buyer's name, mailing address, e-mail address, and payment processing (e.g. credit card) information. This may prepare the shared payment processing system 200 to interact with the buyer system 30a on an as-needed basis.

The shared payment processing system 200 may receive a buyer's non-conditional commitment to purchase from the merchant a specific item (or items) at a specific purchase price, as shown at step 106. For example, this commitment may be in the form of an indication, transmitted from the buyer device or the merchant device to the shared payment system 200 indicating that the buyer has provided credit card or other payment information and authorized a payment in the amount of, or committed to accepting a charge up to the full amount of the purchase price. In an embodiment, this information may be transmitted to the shared payment system after the buyer operates a web-browsing or other user interface to follow a link in a confirmatory-email sent to the buyer by the merchant, etc. to a website interface presented by the shared payment processing system and permitting the buyer to initiate a shared-payment transaction.

Optionally, information relating to the purchase transaction may be transmitted from the merchant system, e.g. 20*a*, to the shared payment processing system 200 in connection with the shared payment processing system's receipt of the buyer's non-conditional commitment to purchase from the merchant an item (or items) at a purchase price. The information transmitted from the merchant system, e.g. 20*a*, to the shared payment processing system 200 may include, for example, one or more of the vendor's website address and/or other contact information, information identifying the item, the purchase price, and the buyer's payment processing information, such as a credit card number. This non-conditional commitment may be expressed in any suitable one of various ways, as will be appreciated by those skilled in the art. For example, in one embodiment, all information typically gathered by the merchant, e.g. via the merchant's website, may be gathered by the merchant, and then one or more of merchant identification information, buyer identification information, item identification information, price identification information and payment identification information may be transmitted from the merchant system 20*a* to the shared payment processing system 200, and the receipt of such information is taken by the shared payment processing system 200 to be the buyer's non-conditional commitment. Alternatively, for example, all such information may be gathered from the buyer by the shared payment processing system 200, or from both the merchant system 20*a* and the buyer by the shared payment processing system 200. By way of further example, the shared payment processing system 200 may receive only a subset of such information, such as merchant identification information and price identification information, and the receipt of such information may be taken by the shared payment processing system 200 to be the buyer's non-conditional commitment. Alternatively, a different signal may be used to signal the buyer's non-conditional commitment, and any required information may subsequently be gathered by the shared payment processing system 200.

The buyer's commitment, in the context of a shared-payment transaction, may be to complete the transaction within a defined period of time, as shown in step 106, regardless of whether any additional payors will make contributions toward the purchase price. The defined period of time may be preferably explicitly presented to the buyer by the system 200, or acknowledged by the buyer in some other manner. In one embodiment, the shared payment system 200 may be configured to use a predetermined period of time for all buyers, or classes of buyers or classes of purchases. For example, the system may be configured to store such period information in its memory 218, e.g. a period measuring one month from the buyer's commitment to purchase the item(s). In another embodiment, the system 200 is configured to present each buyer with a graphical user interface, e.g. via its website interface, that permits the buyer to establish a period of time to be used for that buyer's transaction. For example, a buyer could specify that the purchase be completed on a date that is a period of 2 weeks from the commitment date. Alternatively, the buyer could specify a particular date on which the determination is to be made, e.g., Aug. 3, 2008, to allow for time to ship and wrap the item(s) in advance of a birthday or other party on a predetermined date on which the buyer will want to be in possession of the item(s). In other embodiments, the merchant may specify the time period to be used, for all its buyers, for certain classes of buyers, for certain classes of items, etc.

The separation in time between the buyer's commitment date and the date of completion of the transaction provides time for additional payors to join in a group contributing toward purchase of the item(s). However, the certainty of a date on which the transaction will take place, regardless of whether any additional payors are successfully recruited, ensures that the transaction will take place, and eliminates uncertainty for the merchants.

The shared payment processing system 200 may receive from the buyer an indication of the buyer's preferred share, as shown at step 108. The buyer's preferred share is a reflection of the amount of the total purchase price that the buyer would prefer to pay. Accordingly, although the buyer has committed to paying the full purchase price for the item, the buyer may nevertheless seek to pay for only a fractional share of the purchase price, e.g., provided that third parties join in the transaction to make a group purchase of the item, with a fractional share of the purchase being borne by each of the buyer and each participating third party. For example, a buyer may commit to purchasing an anniversary gift for his parents (in the amount of $300), but may seek to pay a preferred share of $100, provided that each of his two siblings join in the transaction and commit to funding a fractional share of $100 each.

The shared payment processing system 200 then receives from the buyer contact information for communicating with one or more third parties, as shown at step 110. As used herein, a "third party" is an entity capable of funding a payment that is neither the buyer nor the merchant. For example, the buyer may provide to the shared payment processing system 200 via its website interface, e-mail addresses of one or more third parties. Alternatively, the contact information may be in the form of the buyer's selection of a predefined group (e.g. XYZ community church, ABC University Alumni Association, etc.) for which the system retrieves relevant email addresses or other contact information. In an embodiment, the contact information may be in the form of information associated with a third party on a social networking website, tool, program and/or the like. In an embodiment, the contact information may include a telephone number, such as a number associated with a cellular telephone, a landline, mobile devices and/or the like. This information may be provided by the buyer via the system's website interface. The system stores contact information from the instructions in its memory 218 as third party contact data 234, as shown in FIG. 4. For illustrative purposes, FIG. 3 shows an exemplary simplified data structure showing, for example, five third-party e-mail addresses provided by a buyer (Buyer 1 ID) and stored as transaction data in association with a particular transaction record (record #1 in this example) involving the buyer (Buyer 1 ID).

The system 200 may present the buyer with a graphical user interface, e.g. via the system's website, permitting the buyer to identify a specific fractional share proposed by the buyer to be paid by each of the third parties, and the system 200 then receives from the buyer an indication of a specific fractional share to be paid by a first (or next) third party, as shown at step 112. As used herein, a "fractional share" is any portion that is greater than 0% and less than 100% of the entire purchase price. It will be appreciated that any one of various different methods may be used for defining the fractional shares. By way of example, the shares may be predetermined by the system 200 or may be specified by the buyer. The shares may be identical, or different. The shares may be expressed in percentages, or in dollars or other units of currency, such as dollars. Alternatively the shares may be expressed in terms of a minimum dollar or percentage amount, and funding commitments exceeding the minimum will be accepted. FIG. 6 illustrates an exemplary graphical user interface that may permit a buyer to provide a preference share value, third-party information, fractional share value(s) and/or the like.

As shown at step 114 of FIG. 2, the shared payment processing system 200 may check to determine whether the sum of the buyer's preferred share and all the fractional shares assigned by the buyer to third parties equals the total amount of the purchase price for the item(s). If not, then the system 200 may continue to prompt the buyer and receive from the buyer indications of fractional shares to be paid by third parties, as shown at steps 114 and 112. This may continue until fractional shares (including the buyer's preferred share) totaling the purchase price have been assigned among the buyer and third parties.

If the system determines in step 114 that the sum of the buyer's preferred share and all the fractional shares assigned to third parties equals the total amount of the purchase price for the item(s), then the system may 200 "lock" the order, as shown at step 116. Locking of the order confirms that the assignment of fractional shares is complete, and causes the defined period of time for completing the order to begin to run. FIG. 7 illustrates an exemplary locked order according to an embodiment.

After the order has been locked, the shared payment processing system 200 may transmit invitations to the third parties using the contact information provided by the buyer, as shown at step 118. The invitations invite third parties to join a purchase group for the item(s) that the buyer has committed to purchase from the merchant. The buyers are invited to join the purchase group by committing to fund a fractional share of the purchase price.

Each invitation may include an identification of the item/items, the merchant from which it/they are to be purchased, and a textual solicitation to join in the purchase group by funding a fractional share of the purchase price, etc. The invitation may be provided in the form of an email message transmitted from the shared payment processing system 200 (or merchant system) to the individual e-mail addresses provided by the buyer. In an embodiment, the invitation may be sent to a third party using contact information associated with a social networking website, tools, program and/or the like. In an embodiment, the invitation may be provided in the form of a text message, such as a short messaging service ("SMS") message, a multimedia messaging service ("MMS") message and/or the like.

In a preferred embodiment, each invitation identifies a specific fractional share to be paid by a respective third party, and seeks the third party's commitment to fund the fractional share. The fractional share to be paid by each third party may be specified by the buyer, in view of the buyer's identification of a specific fractional share intended to be paid by the buyer (the buyer's preferred share). In certain embodiments, the system may be configured such that each third party may only agree to or refuse to fund the specified fractional share. In other embodiments, the system may be configured to permit each third party may choose to fund a fractional share in the exact amount of the specified fractional share, in an amount greater than the specified fractional share, or in an amount less than the specified fractional share. In alternative embodiments, the system may be configured to provide an indication that the proposed fractional shares are defined in amount, but not assigned to any specific third parties, and that a funding commitment from any third party in any amount should be accepted.

In a preferred embodiment, the invitation may be transmitted electronically from system 200 as an email message. The invitation may include any suitable content. For example, the invitation may include information about the goods, e.g. of a type typically included in an e-commerce website selling the good (including information extracted from the merchant's website), a hyperlink to the merchant's website, etc.

By way of example, each third party may browse an email invitation using a conventional email client device, such as a conventional personal computer, smart-phone, etc. configured with appropriate conventional email client software. Any third party choosing to make a commitment to fund a fractional share may do so in a straightforward manner, e.g. by selecting a link contained in the email and interacting with an appropriate website interface to select a particular fractional share, and to provide payment processing information, such as credit card information. By doing so, the third party may effectively authorize a charge in a specific amount to a specific charge/payment account. As discussed above, in certain embodiments, the system may be configured such that each third party may only agree to or refuse to fund the specific fractional share specified by the buyer (e.g., $500). In other embodiments, the system may be configured to permit each third party to choose to fund a fractional share in the exact amount of the specified fractional share (e.g., $500), in an amount greater than the specified fractional share (e.g., $600), or in an amount less than the specified fractional share (e.g., $400). In response to the third parties' actions to fund a fractional share, the system 200 may receive the third parties' funding commitments, as shown at step 120. For example, this may include receiving information identifying the third party, the amount of the fractional share to be funded, and the third party payment processing information. That information may be stored by the shared payment processing system 200 as third party payor data 236 in the memory 218 of the system 200, as shown in FIG. 4. FIG. 8 illustrates an exemplary interface showing a funding commitment and information concerning processing of payment information according to an embodiment.

Exemplary share commitments and payment processing information is shown in the exemplary data structure of FIG. 3 for illustrative purposes. In the example illustrated in record 1 of FIG. 3, the buyer having a user ID of Buyer 1 ID defined fractional shares for the third parties of $200, $100, $100, $50 and $50, and further defined the buyer's preferred share as $250. For example, FIG. 3 shows that the third party having the email address TP1@email1.com made a $200 funding commitment, and the third party having the email address TP2@email2.com made a $100 funding commitment, etc. Thus, these third parties made funding commitments in the exact amount of fractional shares proposed by the buyer.

By way of further example, record 2 shows that a buyer having a user ID of Buyer 2 ID chose to define equal (identical) fractional shares of $100 each. However, in this embodiment, the third party having the email address TP8@email8.com made a funding commitment ($200) in an amount greater than the buyer's proposed fractional share ($100), and the third party having the email address TP9@email9.com made a funding commitment ($50) in an amount less than the buyer's proposed fractional share ($100). The shared payment processing system 200 may determines whether it has received funding commitments equal to the share price, as shown at step 122. For each third party, the respective funding commitments are those funding commitments provided by the third parties in a specific amount. For the buyer, the buyer's funding commitment at this stage is taken to be the buyer's preferred share. If so, then the shared payment processing system 200 may initiate processing of payments from each third party having joined the purchase group, e.g. having made a share funding commitment, according to their respective funding commitments, as shown at step 128 and as discussed further below.

If, however, it is determined in step 122 that funding commitments have not been received for all fractional shares, i.e. that the sum of the fractional shares for which funding commitments have been made by third parties plus the buyer's preferred share is less than the purchase price, then the shared payment processing system 200 next determines whether the predetermined period of time has expired, as shown at step 124. If the time period has not yet expired, then the "contribution period" is still open, and the system may wait to determine whether additional fractional share commitments will be received from third parties, as shown at steps 126 and 120. An illustrative example of this case is shown as record 3 in FIG. 3.

If commitments have not been received for all fractional shares but it is determined in step 124 that the period of time has expired, then the "contribution period" has closed, and the transaction may be completed. Accordingly, the shared payment processing system 200 may proceed to initiate processing of payments from each third party having joined the purchase group in the amounts of their respective fractional shares, as shown at step 128.

With respect to the payment processing of step 128, the shared payment processing system 200 may initiate the payment processing in any suitable manner, as discussed above. In this example, the shared payment processing system 200 may communicate directly with the credit card payment system 50. Accordingly, in the example of record 1 of FIG. 3, the shared payment processing system 200 may proceed to initiate a charge of $200 to credit card account number 1234 567890 12345 (payable by Third Party 1), a next charge of $100 to credit card account number 9876 5432 1098 7654 (payable by Third Party 2), etc. by transmitting relevant charge amount and charge account information to the credit card payment system 50. Any amount successfully charged to a third party may be stored as actual contribution data 238 in the memory of the shared payment processing system 200. Any failed charge, e.g. due to exceeding of a credit limit, expiration of a charge account, etc., results in a failure to record the amount of the attempted charge as an actual contribution toward the purchase of the item(s).

Each third party's actual contribution may be equal to its funding commitment. The buyer's actual contribution, however, may be determined by subtracting the funding commitments of the third parties from the purchase price, which was the buyer's original commitment. In certain circumstances, the third party's actual contribution might be taken to be $0 if, for example, a charge to that third party's credit card in the amount of that third party's funding commitment is denied, etc. In this event, the buyer's actual contribution may increase by the amount of that third party's failed funding commitment.

In a certain embodiment, the shared payment processing system 200, after determining the amounts to be charged to the buyer and each committed third party, may communicate directly with the credit card payment system 50, e.g. via communications network 40, to effect the payments, and then report completion of the payment transactions to the merchant's system 30a, etc., e.g. via communication network 40, to signal the merchant to proceed to a fulfillment process for the order, by which a process is set in motion to ship the purchased good to the buyer, etc. In another embodiment, the shared payment processing system 200, after determining the amounts to be charged to the buyer and each committed third party, may communicate each charge amount, charge account, and related information to the merchant system 30a, e.g. via communications network 40, and the merchant system 30a communicates directly with the credit card payment system 50, e.g. via communications network 40 to effect the payments, and then proceeds to the fulfillment process. In this example, the system 200 may determine the balance due by the buyer in view of the actual third parties' contributions (resulting from successful payment processing transactions), as shown at step 130. For example, if the third parties have made actual contributions totaling $500 ($200+$100+$100+$50+$50), and the purchase price is $750, then the buyer's balance due is $250 ($750–$500), as shown in the example of record 1 in FIG. 3. The buyer's balance due may be calculated and stored as contribution data 238 in the memory 218 of the system. See FIG. 3. It will be noted that in the example of record 2 of FIG. 3, the balance due by the buyer is not equal to the buyer's preferred share because of differences between the fractional share amounts specified by the buyer for third parties and the amounts of funding commitments of those third parties.

The system then initiates processing of the buyer's payment in the amount of the balance due, as shown at step 132, and the method ends as shown at step 134.

Figure 4:
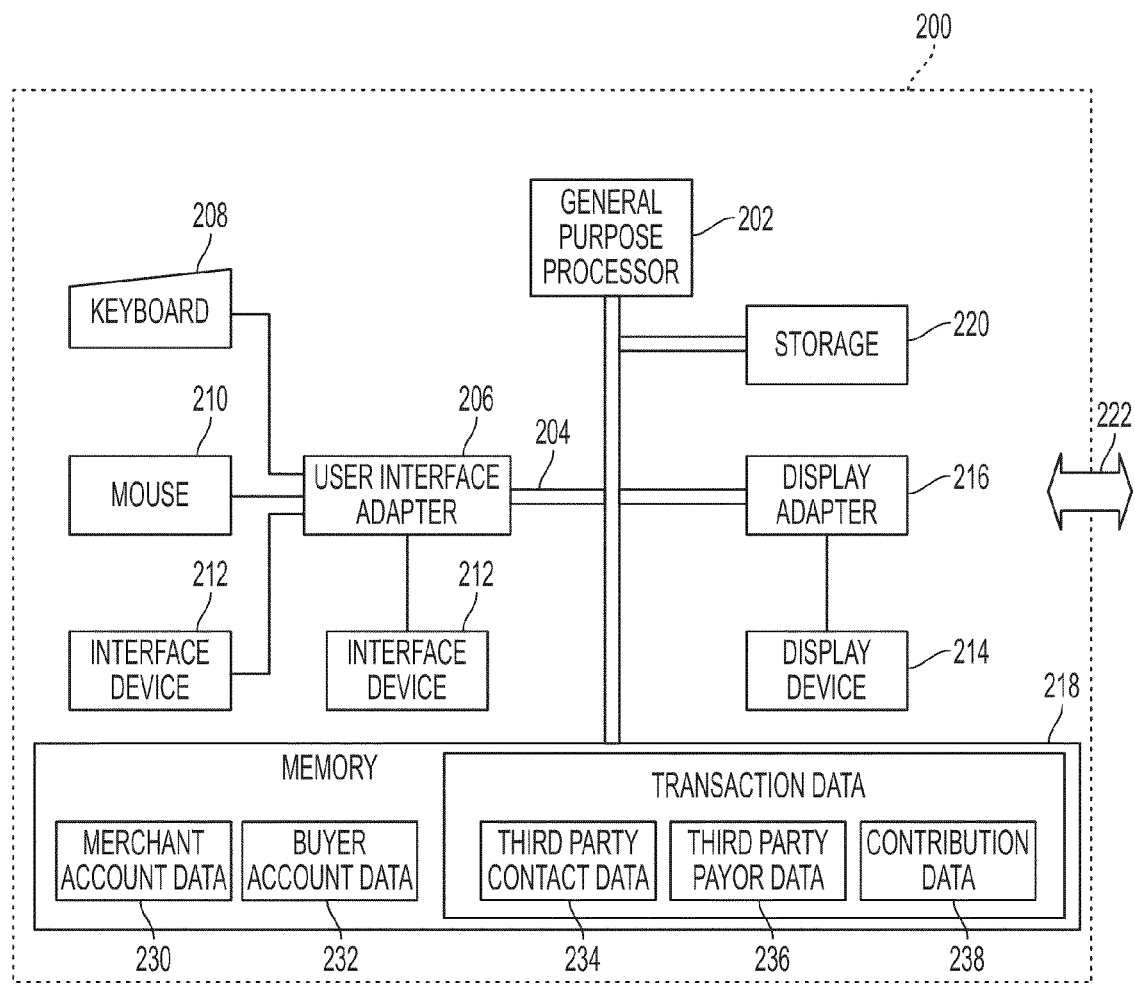
FIG. 4 illustrates a block diagram of an exemplary shared payment processing system according to an embodiment.

FIG. 4 is a block diagram of a shared payment processing system (shown logically as a single representative server for ease of illustration) 200 (see FIG. 1) according to an embodiment. The shared payment processing system 200 may include server hardware storing executing specially-configured computer software for carrying out a method in accordance with the present invention. Accordingly, the shared payment processing system 200 of FIG. 4 may include a microprocessor (CPU) 202 and a bus 204 employed to connect and enable communication between the microprocessor 202 and the components of the shared payment processing system 18 in accordance with known techniques. The shared payment processing system 18 may include a user interface adapter 206, which connects the microprocessor 202 via the bus 204 to one or more interface devices, such as a keyboard 208, mouse 210, and/or other interface devices 212, which can be any user interface device, such as a touch sensitive screen, digitized entry pad, etc. The bus 204 also connects a display device 214, such as an LCD screen or monitor, to the microprocessor 202 via a display adapter 216. The bus 204 also connects the microprocessor 202 to memory 218, which can include a hard drive, diskette drive, tape drive, etc.

The shared payment processing system 200 may communicate with other computers or networks of computers, for example via a communications channel, network card or modem 222. The shared payment processing system 200 may be associated with such other computers in a local area network (LAN) or a wide area network (WAN), and operates as a server in a client/server arrangement with another computer, etc. Such configurations, as well as the appropriate communications hardware and software, are known in the art.

The shared payment processing system's software may be specially configured in accordance with the present invention. Accordingly, as shown in FIG. 4, the shared payment processing system 200 may include computer-readable, microprocessor-executable instructions stored in the memory for carrying out the methods described herein. Further, the memory stores certain data, e.g. in databases or other data stores shown logically in FIG. 4 for illustrative purposes, without regard to any particular embodiment in one or more hardware or software components. For example, FIG. 4 shows schematically storage in the memory 218 of merchant account data 230, buyer account data 232, and transaction data including third party contact data 234, third party payor data (including credit card or other charge account information) 236 and contribution data 238.

Additionally, computer readable media storing computer readable code for carrying out the method steps identified above may be provided. The computer readable media may store code for carrying out subprocesses for carrying out the methods described above.

A computer program product recorded on a computer readable medium for carrying out the method steps identified above may be provided. The computer program product may include computer readable instructions for carrying out the methods described above.

While there have been described herein the principles of the invention, it is to be understood by those skilled in the art that this description is made only by way of example and not as a limitation to the scope of the invention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for processing sales transactions, the system comprising:
 a first computing device in communication with a buyer-operated computing device; and
 a computer-readable storage medium in communication with the first computing device, wherein the computer-readable storage medium comprises one or more programming instructions for:
  receiving an order comprising one or more of:
   a commitment of a buyer to purchase an item, and
   a preferred share value associated with the buyer, wherein the preferred share value represents at least a first portion of a purchase price associated with the item,
  receiving contact information associated with one or more third parties,
  receiving a fractional share value associated with each of the one or more third parties, and
  in response to a sum of the fractional share values associated with each third party and the preferred share value equaling the purchase price associated with the item, using the received contact information to send a message to each third party, wherein each message comprises the fractional share associated with the third party,
  receiving a response from at least one of the one or more third parties, wherein the response comprises a funding commitment value equal to a portion of the purchase price to be paid by the third party,
  processing payment of the funding commitment value from the at least one third party by transmitting the funding commitment value and charge account information associated with the third party to a credit card payment system,
  receiving, from the credit card payment system, an indication of a failed charge associated with one of the at least one third party, and
  determining a balance owed by the buyer by:
   determining a first value equal to a difference between the purchase price and a sum of the funding commitment values associated with the at least one third party,
   determining the funding commitment value associated with the third party having the failed charge, and
   summing the first value and the determined funding commitment value.

2. The system of claim 1, wherein the computer-readable storage medium comprises one or more programming instructions for processing payment of the balance from the buyer.

3. The system of claim 2, wherein the programming instructions for processing payment of the balance comprise one or more programming instructions for transmitting the balance and charge account information associated with the buyer to a credit card payment system.

4. The system of claim 1, wherein the computer-readable storage medium comprises one or more programming instructions for in response to a sum of the funding commitment values received from the at least one third party and the preferred share value equaling the purchase price, processing payment of the funding commitment values from the at least one third party.

5. The system of claim 4, wherein the programming instructions for processing payment of the funding commitment values comprise one or more programming instructions for one or more of the at least one third party, transmitting the funding commitment value and charge account information associated with the at least one third party to a credit card payment system.

6. The system of claim 4, wherein the computer-readable storage medium comprises one or more programming instructions for determining a balance owed by the buyer by determining a difference between the purchase price and a sum of the funding commitment values associated with the at least one third party; and processing payment of the balance from the buyer.

7. The system of claim 1, wherein the computer-readable storage medium comprises one or more programming instructions for:
 processing payment of the funding commitment values from the third parties; and
 processing payment of the balance from the buyer.

8. The system of claim 1, wherein the one or more programming instructions for receiving a commitment of a buyer comprises one or more programming instructions for receiving one or more of the following:
 merchant identification information;
 buyer identification information;
 item identification information;
 price identification information; and
 payment identification information.

9. The system of claim 1, wherein the one or more programming instructions for receiving contact information associated with one or more third parties comprise one or more programming instructions for receiving one or more email addresses associated with each of the third parties.

10. The system of claim 1, wherein the one or more programming instructions for receiving a fractional share value associated with each of the one or more third parties comprise one or more programming instructions for receiving a different fractional share value for each of the third parties.

11. The system of claim 1, wherein the one or more programming instructions for receiving a fractional share value associated with each of the one or more third parties comprise one or more programming instructions for receiving a same fractional share value for each of the third parties.

12. The system of claim 1, wherein the one or more programming instructions for receiving a fractional share value associated with each of the one or more third parties comprise one or more programming instructions for in response to the sum of the fractional share values associated with each of the third parties and the preferred share value not equaling the purchase price, prompting the buyer to provide fractional share values for the third parties.

13. The system of claim 1, wherein the one or more programming instructions for using the received contact information to send a message to each third party comprise one or more programming instructions for sending an email message to each third party comprising one or more of the following:
- an identification of the item;
- a merchant from which the item is to be purchased; and
- a textual solicitation to fund the fractional share value.

* * * * *